United States Patent [19]
Caines et al.

[11] Patent Number: 5,928,781
[45] Date of Patent: Jul. 27, 1999

[54] CROTONIC ACID POLYMER COATED SUBSTRATES FOR PRODUCING OPTICALLY VARIABLE PRODUCTS

[75] Inventors: R. Scott Caines; Stephen J. Gust, both of Greenville; John M. Heberger, Greer, all of S.C.

[73] Assignee: Mitsubishi Polyester Film, LLC, Greer, S.C.

[21] Appl. No.: 08/967,447

[22] Filed: Nov. 11, 1997

[51] Int. Cl.$^6$ .............................. B32B 27/06; B32B 27/36
[52] U.S. Cl. .................. 428/341; 427/293.5; 427/412.5; 428/483; 428/413
[58] Field of Search .................. 427/393.5, 412.5; 428/341, 483, 913

[56] References Cited

U.S. PATENT DOCUMENTS

| | | | |
|---|---|---|---|
| 3,821,156 | 6/1974 | Farrar | 260/40 |
| 3,884,870 | 5/1975 | Dodson et al. | 260/40 |
| 4,230,643 | 10/1980 | Eichorn | 525/253 |
| 4,434,010 | 2/1984 | Ash | 106/291 |
| 4,808,615 | 2/1989 | Ott et al. | 514/89 |
| 4,930,866 | 6/1990 | Berning et al. | 350/320 |
| 5,059,245 | 10/1991 | Phillips et al. | 106/22 |
| 5,059,454 | 10/1991 | Todd et al. | 427/259 |
| 5,084,351 | 1/1992 | Phillips et al. | 428/411.1 |
| 5,135,812 | 8/1992 | Phillips et al. | 428/403 |
| 5,171,363 | 12/1992 | Phillips et al. | 106/22 |
| 5,279,657 | 1/1994 | Phillips et al. | 106/22 |
| 5,281,480 | 1/1994 | Phillips et al. | 428/412 |
| 5,383,995 | 1/1995 | Phillips et al. | 156/230 |

*Primary Examiner*—Michael Lusignan

[57] ABSTRACT

A method is provided for forming a dissolvable or strippable polymeric release coating on the surface of flexible web, forming an overcoated metallized or optically variable layer on said release coating, and stripping or dissolving the release coating to release the overcoated layer. The release coating comprises a polymer of crotonic acid which is soluble in a solvent such as acetone. The polymer may be a copolymer of crotonic acid and at least one vinyl ester such as vinyl acetate. The release coating may be formed during an in-line process which begins with drawing the flexible web from a molten polymeric material. The methods are particularly advantageous for forming optically variable flakes and multilayered optically variable devices.

45 Claims, No Drawings

5,928,781

CROTONIC ACID POLYMER COATED SUBSTRATES FOR PRODUCING OPTICALLY VARIABLE PRODUCTS

FIELD OF THE INVENTION

The present invention relates to products having solvent strippable release coatings which can be used as supports for the formation of a metallized layer thereon. More specifically, the present invention relates to reclaimable polyester film products having a reclaimable acetone strippable coating, and methods for making coated products which can be used in the production of optically variable layers and flakes.

BACKGROUND OF THE INVENTION

Optically variable flakes are used in paints and inks for obtaining a color shift between two distinct colors at first and second angles of incident light. Optically variable pigments (OVP) incorporating such flakes play an important role in the security printing industry. By physically aligning optically variable flakes incorporated in an ink or paint, a dramatic and uniform color shift can be created which cannot be reproduced by photocopiers and printers. This desirable feature has led many nations to use optically variable pigments in their currencies.

U.S. Pat. No. 4,434,010 to Ash teaches methods of forming optically variable flakes, inks, paints and devices. An optical coating is formed by vacuum coating a metallized layer on a flexible web which is soluble in a preselected liquid. After the optical coating is formed, the coated web is passed through the preselected liquid and the web is dissolved away from the coating. Depending upon the desired application, the remaining optical coating can be secured on a substrate to form a replicated coating or it may be broken into thin film flakes which are recovered and used in inks and paints. The patent discloses the use of water soluble webs made of polyethylene oxide, methyl-hydroxy-propyl cellulose, and polyvinyl alcohol resin, and webs made of acrylic plastic materials which are soluble in organic solvents such as acetone or methyl ethyl ketone. The methods disclosed for making inks require a flake treatment step to remove residual web material and solution from the produced flakes.

U.S. Pat. Nos. 5,084,351; 5,059,245; 5,135,812; 5,171,363; 5,279,657; 5,281,480; and 5,383,995, each to Phillips, et al. each disclose a method of making optically variable ink wherein a substrate or forming web comprising an insoluble flexible material such as polyethylene terephthalate is coated with a solvent-soluble acrylic polymer known as 517-1, available from Thermark Division of Avery International. The composition of the acrylic polymer is not disclosed. Suitable solvents for dissolving the acrylic polymer are acetone and methyl ethyl ketone. Complete polymer removal with the solvents is not reported, and after filtering, the resultant flakes require a spraying with fresh solvent to remove traces of the soluble polymer.

The use of acrylic polymers as acetone or methyl ethyl ketone soluble web materials has been discussed in U.S. Pat. Nos. 5,059,245 and 5,084,351, both to Phillips, et al. However, it has been found that the specifically suggested polymethyl-methacrylate disclosed in these patents suffer in general from an inability to be even slightly dissolved by acetone in a single pass through the solvent.

Polymeric materials for release coatings should be able to form a uniformly thin coating. The molecular weight and glass transition properties of the polymeric material should render the material stable at the high temperatures associated with vacuum deposition of metal optical layers, without causing defects in the optical layers and in flakes produced from such layers. In addition, preferred polymeric coating materials should be soluble in aqueous solutions and should emulsify into water-based emulsions, and thus not require the use of potentially dangerous solvents to form coating solutions thereof. Furthermore, the polymeric material should form a clear and homogeneous release coating which will not detrimentally affect properties such as clarity and uniformity in topcoated or overcoated metallized optical layers.

The present invention provides the aforementioned desired properties in a release coating material and provides methods of making high-quality, high-clarity topcoated metallized layers having predictable and repeatable properties. The present invention provides a strippable release coating for forming optically variable flakes and devices, which: 1) can be coated on a substrate to form a uniformly thin film layer, 2) is stable under conditions associated with the vacuum deposition of metals, 3) can be formed from a relatively safe, non-flammable aqueous coating emulsion, and 4) can readily and completely dissolve in a single pass through a common, inexpensive and relatively safe organic solvent such as acetone to form metallic flakes from metallized layers coated thereon. Optical, metallic layers of high quality can be formed on the polymeric coating and easily separated from the coating for subsequent use in optically variable inks, paints, pigments and devices.

SUMMARY OF THE INVENTION

The present invention provides strippable release coatings which are soluble in a preselected solvent for the production of optically variable products. According to embodiments of the invention, the release coating comprises a polymer of crotonic acid, preferably a copolymer of crotonic acid and at least one other monomer such as a vinyl ester. Most preferably, the release coating polymer comprises a copolymer of vinyl acetate and crotonic acid, which is soluble in an organic solvent, such as acetone. According to some embodiments, the release coating comprises a terpolymer of vinyl acetate, crotonic acid and vinyl neodecanoate. In yet other embodiments of the invention, release coatings are provided comprising polymers of vinyl acetate and crotonic acid with other monomers, which are strippable in a solvent, for example, acetone.

The present invention can be employed to form optically variable flakes and multilayered optically variable devices. Metallized layers of optically variable materials can be deposited on the release coated substrate. When the release layer is dissolved or stripped in the solvent, the optically variable material layer is released.

When the optically variable material layer is released in the form of flakes or converted to a flake form, the flakes can subsequently be used to make optically variable inks, pigments, paints and coatings. When the material layer is released as a continuous coating, the coating can be used in the manufacture of a replicated coating.

The present methods provide an in-line manufacturing procedure wherein a flexible web of polyethylene terephthalate or other polymeric substrate is drawn, uniaxially oriented, coated with the dissolvable release coating, and then oriented in the transverse direction. According to embodiments of the invention, the release coating formulations are strippable with acetone, but can be applied in the form of a safe, non-flammable, alkaline aqueous coating solution. The aqueous coating solutions of the invention render the formulations advantageous for in-line coating methods where flammable coating solutions are not suitable.

According to the embodiments of the invention, polyethylene terephthalate is a preferred substrate material to be coated with the release coating formulations of the invention.

The present invention also provides structures made in accordance with the present methods. Among the structures within the realm of the invention, rolls of flexible web material or film having a release coating thereon are provided.

DETAILED DESCRIPTION OF THE INVENTION

A release coating comprising a crotonic acid-containing polymer is continuously formed on the surface of a substrate for producing optically variable products. The release coating adhesively receives a metallized coating without substantially destroying the releasability of the metallized coating from the substrate. The metallized layer is formed or deposited on the release coating and the release coating is dissolved with a preselected solvent. The release coating formulations of the invention are preferably formed from a solution or emulsion containing the release coating polymeric material. The solution or emulsion is coated onto the substrate and dried, leaving a release coating of the polymeric material on the substrate.

According to embodiments of the invention, the crotonic acid-containing polymer of the release coating is a polymerization product of at least about 5% by weight crotonic acid and at least one other monomer, such as a vinyl ester, wherein the copolymer is soluble in the preselected solvent. The crotonic acid containing polymer is preferably a copolymer of vinyl acetate and crotonic acid wherein the copolymer is soluble in the solvent. According to some embodiments of the invention, the release coating comprises a terpolymer of vinyl acetate, crotonic acid and vinyl neodecanoate. In other embodiments of the invention, polymers comprising vinyl acetate and crotonic acid and at least one other monomer are used for the release coating.

According to some preferred embodiments of the invention, the release coating consists essentially of a vinyl acetate and crotonic acid copolymer, or consists essentially of a vinyl acetate, crotonic acid and vinyl neodecanoate terpolymer.

The release coatings of the present invention are useful for forming optically variable layers and flakes, and in producing multilayered optically variable devices. According to embodiments of the invention, a metallized and/or optically variable layer is formed on the release coating, and is separated from the release-coated substrate upon stripping the release coating in a preselected solvent. The release coating is contacted with the preselected stripping solvent to dissolve or otherwise strip the release coating and, thus release the overcoated layer formed thereon. According to embodiments of the invention, the overcoated layer breaks-up as the release coating is removed, as disclosed in U.S. Pat. Nos. 5,059,245 and 5,383,995 to Phillips, et al. The flakes can then be collected, divided to desired size, and used in optically variable inks, paints, pigments, coatings and devices.

The release coating may be formed by spray coating, doctoring with a meyer rod, gravure coating, or otherwise coating a flexible substrate with a coating formulation according to the invention. In embodiments of the invention, the coating formulation is an aqueous, non-flammable, relatively safe coating solution of the release coating polymer in an alkaline aqueous solvent. The safe, non-flammable properties of the present coating formulations render them advantageous for in-line coating methods.

According to preferred embodiments of the invention, the substrate comprises a flexible film. Preferred materials for the substrate include flexible and thin films, sheets and webs. Films, sheets, webs and structures of polymeric material, such as polyester, are preferred. One substrate material used in accordance with embodiments of the invention is polyethylene terephthalate (PET), preferably in the form of a thin film. According to embodiments of the invention, the substrate is drawn and in-line coated immediately after drawing. In other embodiments of the invention, substrate films, for example, PET films, are coated off-line. PET films having biaxially stretched thicknesses of from about 100 to about 400 gauge are preferred according to some embodiments of the invention, with thicknesses of from about 140 to about 300 gauge being more preferred, for example, a 200 gauge PET film. Exemplary PET films which can be used as the substrate include slip agent-filled PET films and unfilled PET films. In-line drawn polyester films are preferred. The substrate material may or may not be soluble in the stripping solvent used for dissolving or stripping the release coating.

The release coating may be formed from a solution, emulsion, or other liquid carrier or vehicle for delivering a polymer comprising crotonic acid and preferably at least one vinyl ester, more preferably, a polymer comprising vinyl acetate and crotonic acid. According to some embodiments of the invention, the release coating polymer additionally comprises a vinyl neodecanoate component. The substrate polymer, such as PET, is preferably reclaimable in the substrate manufacturing process. Processes for making copolymers of vinyl esters and crotonic acid which may be used in the release coatings are disclosed in U.S. Pat. No. 4,230,643 to Eichhorn, et al., herein incorporated by reference in its entirety.

According to preferred embodiments of the invention, the release coating polymer is a polymerization product of at least about 50% by weight vinyl acetate, from about 5% by weight up to about 50% by weight crotonic acid, and optionally up to about 10% by weight vinyl neodecanoate, said percentages adding up to 100%. According to some preferred embodiments of the invention, the polymer is a copolymer consisting essentially of polymerized vinyl acetate and crotonic acid, or a terpolymer consisting essentially of vinyl acetate, crotonic acid and vinyl neodecanoate units.

According to embodiments of the invention, the release coating polymer comprises a polymerization product of from about 50% by weight to about 95% by weight vinyl acetate and from about 5% by weight to about 50% by weight crotonic acid, said percentages adding up to 100% by weight. The proportions of the reactant monomers can also be represented in parts by weight, based on 100 total parts by weight. According to some embodiments of the invention, the release coating polymer comprises a polymerization product of from about 70% by weight to about 92% by weight vinyl acetate and from about 8% by weight to about 30% by weight crotonic acid, said percentages adding up to 100%.

According to other embodiments of the invention, the polymerization product can be defined as a terpolymer having from about 50% by weight to about 95% by weight vinyl acetate, from about 5% by weight to about 50% by weight crotonic acid, and from about 0.001% by weight to about 5% by weight vinyl neodecanoate, said weight percentages adding up to 100%.

One exemplary copolymer of vinyl acetate and crotonic acid which may be employed is available from National Starch and Chemical Company, of Bridgewater, N.J., as RESYN 28-1310. An exemplary terpolymer of vinyl acetate, crotonic acid and vinyl neodecanoate which may be used is RESYN 28-2930, also available from National Starch and Chemical Company. The RESYN 28-1310 polymer material is an anionic, fine, translucent dry bead polymer having a 2% maximum volatiles content, an acidity of 1.16 meq/g, a glass transition temperature ($T_g$) of 28° C., a dry bulking value of 49.3 lb/ft$^3$, a specific gravity of 1.2 g/cc at 25° C., an intrinsic viscosity of 0.3 when measured in acetone at 30° C., and a weight average molecular weight of from about 35,000 to about 45,000 atomic units. Integrated proton NMR spectra analysis indicates that the RESYN 28-1310 copolymer is the polymerization product of 72.5 parts by weight vinyl acetate and 27.5 parts by weight crotonic acid. RESYN 28-1310 is soluble in methanol, ethanol, acetone, methyl ethyl ketone, ethyl acetate and methylene chloride, and insoluble in water, isopropanol, hexane and toluene.

The RESYN 28-2930 polymer material is an anionic, fine, translucent dry bead polymer having a 2% maximum volatiles content, an acidity of 1.16 meq/g, a glass transition temperature ($T_g$) of 39° C., a dry bulking value of 49.2 lb/ft$^3$, a density of 1.132 g/cc at 25° C., an intrinsic viscosity of 0.28 when measured in acetone at 30° C., and a weight average molecular weight of from about 50,000 to about 60,000 atomic units. Integrated proton NMR spectra analysis indicates that the RESYN 28-2930 polymer is the polymerization product of 90.2 parts by weight vinyl acetate, 9.8 parts by weight crotonic acid, and a small amount of vinyl neodecanoate, believed to be less than about 5 parts by weight. RESYN 28-2930 is soluble in methanol, ethanol, isopropanol, acetone, methyl ethyl ketone, ethyl acetate and methylene chloride, and insoluble in water, hexane and toluene.

Optional additives may be included in the release coating formulations of the invention. Coalescing agents such as glycerine, polyethylene glycol (PEG) and triethylene glycol (TEG) may be included in the coating solution or emulsion in amounts effective to improve film formation of the release coating. The incorporation of coalescing agents must be done with care, however, to minimize degassing of agent during vacuum deposition of an overcoated metallized or optically variable layer. If coalescing agents are used, amounts of from about 1% by weight to about 10% by weight, based on the dry weight of the release coating, are preferred, for example, about 5% by weight.

Other additives which may be used in the coating solutions or emulsions are antiblocking or slip agents. Finely divided silica, for example, may be incorporated into the release coating in amounts effective to reduce friction between the release coating and the substrate and/or overlayer. One preferred slip agent for incorporation into the release coating is NALCO 1060, a finely divided silica having an average particle size of about 60 millimicrons, available from Nalco Chemical Company, Chicago, Ill. Amounts of slip agent in the range of from about 0.1% to about 1.0% by weight are preferred, particularly if the agent is a finely divided silica. Exemplary particle sizes for the slip agent may range from about 4 millimicrons to about 80 millimicrons. More preferably, a slip agent is incorporated instead into the underlying substrate, as, for example, when a filled PET film is used as the substrate. Exemplary slip agents, fillers and filled PET films are disclosed, for example, in U.S. Pat. No. 3,821,156 to Farrar and U.S. Pat. No. 3,884,870 to Dodson, et al., which are incorporated herein by reference in their entireties.

According to embodiments of the invention, the release coating is formed from a solution, as opposed to an emulsion, of a vinyl acetate and crotonic acid polymer. The solution is coated onto a substrate and dried., According to preferred embodiments of the invention, the release coating solution comprises a polymer in accordance with the invention dissolved in a basic aqueous solution. A preferred basic aqueous solvent for making a coating solution comprises an aqueous solution of ammonium hydroxide. Solutions comprising from about 1 part by weight to about 2 parts by weight of 30% by weight ammonium hydroxide, and 100 parts by weight deionized water, are preferred. Relatively safe organic solvents are also preferred for the release coating formulations of the invention, for example, acetone. Whether the coating solution comprises an aqueous ammonium hydroxide solution or another solvent, it is preferred to at least substantially or completely dry the release coating after formation on the substrate. If the release coating is not sufficiently dried, problems may occur in connection with the degassing of residual volatiles. Such problems include the formation of blemishes on a subsequently formed metallized or optically variable overlayer. Generally the moisture content of the dried release coating may be less than about 5% by weight, preferably less than about 3% by weight, more preferably less than about 1% by weight.

Although polymers in accordance with some embodiments of the invention are insoluble in water, they are soluble in some alkaline aqueous solutions, for example, basic aqueous solutions which sufficiently neutralize the carboxylic groups of the release coating polymer. Generally, alkaline aqueous solutions which achieve a degree of neutralization of about 60% or more are sufficient to render the release coating polymer soluble enough to form an excellent release coating solution. Neutralizations of 90% to 100% are preferred. A corresponding coating solution pH of about 7 or more generally results from such a neutralization. The coating solutions according to preferred embodiments of the invention are non-flammable and thus particularly useful for in-line coating methods where flammable coating formulations generally cannot be safely used without appropriate safety equipment.

The release coating polymers can also be neutralized with 2-amino-2-methyl-1-propanol (AMP), for example, to form a resin which is both water soluble and organic solvent soluble. Neutralization with a base such as AMP or ammonium hydroxide is preferred. Basic aqueous solutions may be used for both release coating solutions and as stripping solvents.

Other solvents may be used for the release coating solutions used according to the present invention. Such other solvents include methanol, ethanol, isopropanol, acetone, methyl ethyl ketone, ethyl acetate, methylene chloride, and mixtures thereof.

Acetone may be employed as a release coating solution solvent because of its low boiling point and high volatility, and because it is relatively safe and does not attack or degrade PET substrates. Basic aqueous solutions are preferred for safety reasons because they are non-flammable and do not attack PET substrates.

The release coating is preferably formed from a solution of the dissolved polymer which contains from about 2.5% by weight to about 30% by weight solids, more preferably, from about 5% by weight to about 20% by weight solids, most preferably from about 6% by weight to about 12% by weight solids. Higher solids contents tend to result in coating solutions that are too viscous and cause film defects in the resulting release coating. Thinner coatings tend to result in bonding of an overcoated metallized layer directly to the substrate, e.g. directly to a PET substrate, which impairs release of the metallized layer.

The weight average molecular weight of the release coating polymer may be from about 10,000 to about 100,000, for example, from about 35,000 to about 60,000, as determined, for example, by gel permeation chromatography.

The solids contents of the coating solution has been found to have little effect on strippability of the particular polymer of the coating solution provided the dry coating weight or thickness is sufficient to prevent bonding of the metallized layer to the substrate. Coating formulations comprising solutions according to embodiments of the present invention overcome the problems associated with emulsion coating techniques such as the undesired formation of macroscopic holes and the undesired production of a porous structure.

Laydown amounts can be used to provide a dried release coating of desired weight, regardless of solids content in the coating solution or emulsion. According to embodiments of the invention, the release coating may be applied at a coating thickness or coating weight of from about 25 dry milligrams per square meter ($mg/m^2$) to about 1200 dry $mg/m^2$, preferably from about 30 dry $mg/m^2$ to about 130 dry $mg/m^2$, most preferably from about 40 dry $mg/m^2$ to about 65 dry $mg/m^2$. The coating weight can be adjusted depending upon how readily the polymeric coating is stripped by the preselected solvent.

According to an exemplary embodiment of the invention, a release coating polymer solution is provided having a solids content in a range of from about 6% by weight to about 12% by weight. The solution may be in-line coated on a drawn PET film substrate which has been uniaxially stretched or oriented in the machine or longitudinal direction. The solution may be applied to the substrate at a wet laydown of from about 0.4 to about 0.8 wet lb./1000 $ft^2$ of forward drawn, uniaxially oriented sheet. The coated substrate may then be dried and stretched widthwise in the transverse direction to from about 3.5 to about 4.0 times the width it had before transverse stretching. Based on the solids content range, the wet laydown range, and a stretch ratio of about 3.7, dry coating weights on the biaxially stretched film of from about 31.7 $mg/m^2$ to about 126.8 $mg/m^2$ may be achieved.

The polymer of the release layer must be dissolvable or strippable in at least one solvent. Because of its low boiling point, high volatility, relative safety, commercial availability, effectiveness and low cost, acetone is a preferred solvent. Other organic and aqueous solvents may also be used as the stripping solvent for the release layer. Both of the RESYN polymers mentioned above are soluble in acetone, and release layers comprising such polymers are acceptably stripped or dissolved from a substrate with a single pass through acetone.

Basic aqueous solvents, including aqueous solutions of ammonium hydroxide, may also be used to strip the release coatings according to some embodiments of the present invention. If an aqueous ammonium hydroxide solution is used, it must be basic enough to sufficiently neutralize the acidic release coating polymer and render the polymer soluble therein. For example, an ammonium hydroxide solution having a pH of from about 7.2 to about 11 may be used as a stripping solvent. Other possible stripping solvents include methanol, ethanol, isopropanol, acetone, methyl ethyl ketone, ethyl acetate, methylene chloride, 2-amino-2-methyl-1-propanol, and mixtures thereof. Acetone is a preferred stripping solvent for use in the present invention.

When acetone is used to strip the release coatings of the present invention, it has been found to consistently provide at least substantially complete stripping of the release coating. Little or no polymer remains on the separated layer or flakes after dissolution or stripping of the release coating in a single step. Embodiments of the invention employing acetone require no additional washing with solvent to cleanse residual polymer from layers or flakes separated from the substrate. This is surprising considering that when acetone is used to strip non-crotonic acid containing polymeric release coatings of the prior art, complete stripping of the release coating has been difficult, if not impossible, to achieve in a single stripping step.

According to a preferred embodiment of the invention, the coating solution comprises a basic aqueous solution, such as an ammonium hydroxide solution, and the stripping solution comprises an organic solvent such as acetone.

According to a preferred embodiment of the invention, the release coating is in-line coated onto the substrate. Off-line coating methods may also be used, but a major advantage of the present invention is the ability to in-line coat the release coating. If an in-line coating process is used, the substrate is freshly drawn, for example, in the form of a polyethylene terephthalate film. The film substrate is then uniaxially stretched in the machine direction, coated in-line with a release coating solution or emulsion, dried, stretched in the transverse direction, and then either immediately in-line coated with a metallized or optically variable overlayer or rolled up for future use. In-line processes eliminate costly down time associated with the loading and unloading, winding and unwinding of a PET film roll as is needed when a release coating is produced off-line.

In-line coating processes which may be used include processes wherein the polymeric substrate is biaxially or uniaxially stretched or oriented. Any of many well known orientation techniques can be used to stretch the substrate.

According to some preferred embodiments of the invention, the substrate is stretched in a first direction, then the release coating is formed on the stretched substrate and dried, and then the coated substrate is stretched in a direction perpendicular or transverse to the first stretching direction. Such a method is referred to herein as an interdraw coating method. Alternatively, the substrate may be biaxially oriented before the release coating is formed thereon, or the substrate may first be coated with the release coating and then the coated substrate is uniaxially or biaxially oriented. After stretching, the substrate may be heat-treated to lock-in the physical properties of the substrate.

According to a preferred embodiment of the invention, a release coating solution is in-line coated onto a surface of a slip agent-filled PET film. Prior to being coated, the film is drawn during the same in-line process and is uniaxially stretched in the machine or longitudinal direction. The release coating solution is applied at a wet laydown amount which results in a target dry coating weight after subsequent stretching or orienting in a direction transverse to the machine direction. The target coating weight of the release coating on the biaxially stretched or tentered substrate is from about 25 dry $mg/m^2$ to about 1200 dry $mg/m^2$, with coating weights of from about 30 dry $mg/m^2$ to about 130 dry $mg/m^2$ being more preferred.

Tenter stretch ratios of between about 3.0:1 to about 4:1 are preferred for PET substrate films having forward drawn, uniaxially stretched film thicknesses of from about 140 gauge to about 1000 gauge. Stretch ratios for the machine or longitudinal direction stretch may also be from about 3.0:1 to about 4:1. Preferred release coated films according to embodiments of the invention are biaxially stretched and have a thickness of from about 40 gauge to about 300 gauge, with thicknesses of from about 142 gauge to about 200 gauge being even more preferred. Thinner films, for example, less than 40 gauge, are generally too flimsy and weak to be used as supporting substrates. The thickness of a substrate film is limited by cost considerations and flexibility requirements.

Before coating the surface of the substrate, the surface may be treated. Preferably, the surface may be corona discharge treated to improve wet-out properties of the release coating solution. A corona treated surface provides a uniformly thick and continuous coating on the surface of the PET substrate film. Corona treatments of from about 2 watts per square foot per minute ($W/ft^2/min$) to about 8 $W/ft^2/min$ are preferred with treatments of about 3–5 $W/ft^2/min$ being more preferred.

According to a further aspect of the present invention, an overlayer is formed on the release coated substrate and is removed when the release layer is stripped or dissolved from the substrate. Particular overcoated layers which are formed according to embodiments of the invention include, but are not limited to, optically variable coating materials, such as multi-layered optically variable structures and devices. In one particular application of the present invention, the substrate with release coating thereon is coated with a vacuum deposited metallized layer. Such metallized layers and multilayered structures are taught, for example, in U.S. Pat. No. 4,930,866 to Berning, et al.; U.S. Pat. No. 5,059,454 to Todd, et al.; and U.S. Pat. No. 5,084,351 to Philips, et al., which are hereby incorporated in their entireties by reference. Particular metallized layers which may be formed on the release coatings of the present invention include silicon oxide containing layers and other metal oxide containing layers. One suitable method for forming a metallized layer on the release coating is the vacuum or vapor deposition of a metallized layer in a bell jar metallizer. Other techniques may also be used to form a metallized overlayer and include various sputtering techniques.

The layer to be formed on and removed from the release coated substrate may be removed in the form of flakes, which are used in optically variable inks, pigments, paints and devices. Methods of forming flakes for such purposes are taught, for example, in U.S. Pat. No. 4,434,010 to Ash; U.S. Pat. No. 5,059,454 to Todd, et al.; and U.S. Pat. No. 5,383,995 to Phillips, et al., which are hereby incorporated in their entireties by reference. Examples of the metal overlayers include dielectric stacks comprising alternate layers of low refractive index materials and high refractive index materials for a total of, for example, nine layers. A variety of low and high index materials known in the art can be used for such an optical multilayer. Exemplary combinations are zinc sulfide with magnesium fluoride and titanium dioxide with silicon dioxide. A variety of other dielectric materials could also be used, such as germanium, silicon, indium oxide and silicon monoxide. When metallized layers such as those disclosed in the latter three patents are formed on the release coating, the layers break-up as the release coating is removed. As the layers break-up, more complete attack of the release coating is achieved as compared to the attack of release coatings overcoated with an unbroken purely aluminum metallized layer.

While contacting the release coating with the stripping solvent can be achieved by a variety of methods, passing the coated substrate through a pan of the stripping solvent is a preferred method. Dipping techniques can also be used to contact the release coating with the stripping solvent. As the stripping solvent attacks the release coating polymer, it is believed that the polymer swells and thus loosens the overlayer and facilitates removal of the overlayer from the coated substrate.

Methods according to embodiments of the invention may further comprise contacting, adhering, or transferring the release coating with a layer formed thereon to a second substrate, and then contacting the release coating with the solvent to remove the original, or first substrate, resulting in the application of the entire layer to the second substrate. Such methods are described in more detail with respect to forming replicated coatings as in U.S. Pat. No. 4,434,010 to Ash. The methods disclosed include putting an amount of adhesive on a surface of an article, laying a coated substrate according to the invention on the surface with the optical coating in contact with the adhesive, using a plate to press the coated substrate and adhesive together to spread the adhesive into a uniform thin layer, curing the adhesive, and separating the optical coating from the substrate by immersing the article in a stripping solvent or flushing the coated surface of the article with a stripping solvent.

One major advantage of the present invention is that the stripped polymer of the release coating of the invention can be reclaimed from the resulting polymer and stripping solvent waste solution, emulsion, or mixture. The reclaimed polymer can then be used in the formation of a new release coating. In addition, release coating formulations according to embodiments of the invention do not substantially adversely affect reclaimability of a polyester substrate having the formulation coated thereon.

The present invention is further illustrated by the following non-limiting examples wherein all parts, percentages and ratios are by weight, and all temperatures are in °C. unless otherwise indicated:

EXAMPLES 1 AND 2

In Example 1, a coating solution was prepared by neutralizing and dissolving a copolymer of vinyl acetate and crotonic acid (RESYN 28-1310) in a basic aqueous solution. Then, the resulting solution was coated onto a polyethylene terephthalate film substrate and subsequently stripped from the substrate with acetone. The neutralization procedure was as follows:

50 grams of Resyn 28-1310 vinyl acetate/crotonic acid copolymer resin beads were placed in a 1000 ml. beaker. 400 grams of deionized water was then added to the beaker resulting in an initial pH of about 4. Then, 4 to 5 grams of a 30% aqueous solution of $NH_4OH$ was added, bringing the pH up to about 7.7. The resultant mixture was then stirred with a magnetic stir bar and the resin beads dissolved. Then 50 additional grams of the Resyn 28-1310 beads were added to the solution followed by additional $NH_4OH$ and then 50 more grams of resin beads. Another 400 grams of deionized water was then added to provide a solution having a solids content of about 15.7% by weight. The pH of the solution was between about 7.0 and 7.5. Some solid resin beads were left undissolved in the beaker. The solution was filter cleaned then coated onto a plain piece of a 400 gauge unfilled, untreated PET film using a No. 23 Meyer rod.

In Example 2, a small amount of the Resyn 28-1310 beads were dissolved in acetone and the resulting solution was coated onto a sample piece of 400 gauge PET similar to that used for Example 1. Both of the coated PET sample films of Examples 1 and 2 were then dried at 90° C. for about 15 minutes. Both coatings were clear. When subsequently washed with acetone, both coatings were stripped by the acetone from their respective PET films.

EXAMPLES 3–28 AND COMPARATIVE EXAMPLES 1–14

Coating formulations were prepared and coated onto 400 gauge unfilled PET film substrates, then tested for acetone removal after deposition thereon of a metallized vacuum-deposited aluminum layer. The results of such tests are shown in Table I below. For each sample, the release coating formulation comprised a solution or emulsion of the coating polymer which was applied to the unfilled, untreated (PET) substrate and dried. The coating formulations of the Examples and Comparative Examples were applied in wet laydown amounts to achieve the dry coating weights indicated in Table I. Except for Examples 3 and 4 and Comparative Examples 2 and 3, the substrate was only uniaxially oriented or tentered in the machine direction at a stretch ratio of about 3.5:1 to about 4:1 before the coating formulation was applied. Then, after the formulation was coated onto the substrate, the coated substrate was oriented or tentered in the transverse direction at a stretch ratio of about 3.5:1 to about 4:1. For Examples 3 and 4, and Comparative Examples 2 and 3, the coating formulations were applied to an already tentered, biaxially oriented PET substrate which had been stretched at a stretch ratio of about 3.5:1 to about 4:1 in each direction. Examples 3 and 4, and Comparative Examples 2 and 3, had very high coating weights because the substrates in those examples were coated using a #3 wire-wound Meyer rod and not subsequently oriented or tentered. The dry coating weights indicated in Table I are the coating weights of each sample on its respective fully tentered substrate.

The release coatings were formed by one of two methods: an in-line coating method (ILC) using, for example, a meyer rod, a doctor blade or a gravure cylinder; or a hand coating draw down technique (DD) which involved the hand draw-down of a coating solution bead using a wire wound Meyer rod. Any of a variety of coating techniques could have been used, provided the wet laydown amount and the solids content of the coating formulation are selected to provide a desired dry coating weight. Dry coating weights of the applied coatings has been found to be much more determinative of acetone strippability than solids content of the coating formulation or wet laydown amounts.

The dry coating weight could not be calculated for Examples 10 and 26 nor for Comparative Examples 7 and 8 because the wet laydown amounts for those samples were not recorded.

For each coating formulation comprising a solution of a RESYN polymer, the formulation was made of a basic aqueous solution of ammonium hydroxide. Each solution had sufficient alkalinity to neutralize 100% of carboxylic acid groups in the coating polymer, with the exception of Examples 20–28 which were neutralized to the extent indicated in Table I.

In Examples 11–17, and Comparative Example 13, NALCO 1060 is a finely divided silica slip agent having an average particle size of about 60 millimicrons, available from Nalco Chemical Company, Chicago, Ill. In Comparative Example 1, Rhoplex B-85 is a polymethyl methacrylate polymer available from Rohm & Haas, Philadelphia, Pa. In Comparative Example 2, Methocel is a hydroxypropyl methylcellulose polymer available from Dow Chemical Company, Midland, Mich. In Comparative Example 3, Duroset E200 is an ethylene/vinyl acetate polymer available from National Starch and Chemical Company, Bridgewater, N.J. In Comparative Examples 1 and 6–9, TRITON X-405 is a nonionic surfactant of the chemical family of alkylaryl polyether alcohols, and is available from Union Carbide, Danbury, Conn. Regarding Comparative Examples 4–10, the polymer RHOPLEX WL-81 is a copolymer of styrene and acrylic ester available from Rohm & Haas, Philadelphia, Pa. Integrated proton NMR spectra analysis indicates that RHOPLEX WL-81 is a copolymer comprising about 39 mole percent (about 32% by weight) polystyrene and about 61 mole percent (about 69% by weight) poly(n-butyl methacrylate). It is believed that the Rohm & Haas polymer RHOPLEX AC-3001 (Comparative Examples 11 and 13) is similarly a copolymer of styrere and an acrylic ester.

For Comparative Example 14, an aqueous homopolymer dispersion of vinyl acetate was used as the coating formulation. The dispersion was supplied by The Chemical Group, A Unit of Monsanto Company, St. Louis, Mo. as GELVA EMULSION TS-30. The dispersion contained from about 55% to about 58% solids, had a pH of from about 4.5 to about 5.5, a Brookfield Viscosity at 25° C. of between 1200 and 1800 cps when tested with a #3 spindle at 30 rpm, and an average homopolymer particle size of about 0.5 microns. The particles carried an anionic charge.

For each of the formulations identified as emulsions in Table I, the formulation comprised a fluid consisting of a microscopically heterogeneous mixture of the coating polymer suspended in deionized water. Proprietary emulsifiers were incorporated into the emulsions by the respective suppliers. Some of the emulsions were diluted with deionized water to obtain lower solids contents.

After the release coating formulations were allowed to dry, a layer of aluminum metal was vacuum deposited on each release coating in a bell jar metallizer. The vacuum deposited aluminum metallized layer had a thickness of from about 400 angstroms to about 600 angstroms. The aluminum coated samples were then immersed in room-temperature acetone and agitated to determine if the aluminum layer could be removed by acetone-stripping the release coating. No scrubbing or scraping of the aluminum metal layer was used to facilitate release.

Acetone strippability for each of Examples 3–28 and Comparative Examples 1–13 is shown in Table I below:

TABLE I

| EXAMPLE | COATING FORMULATION | EMULSION or SOLUTION | CHEMICAL TYPE OF COATING POLYMER | ILC, OLC or DRAW DOWN (DD) | COATING WEIGHT (dry mg/m$^2$) | ACETONE REMOVAL | METAL FOIL APPEARANCE |
|---|---|---|---|---|---|---|---|
| Example 3 | 15.8% Resyn 28-1310 | AQUEOUS SOLUTION | Vinyl acetate-crotonic acid | DD | 1200 | slight | slightly hazy |
| Example 4 | 14.2% Resyn 28-2930 | AQUEOUS SOLUTION | Vinyl acetate-crotonic acid-vinyl neodecanoate | DD | 1079 | slight | slightly hazy |
| Example 5 | 10% Resyn 28-1310 | AQUEOUS SOLUTION | Vinyl acetate-crotonic acid | ILC | 95.8 | complete | clear |
| Example 6 | 10% Resyn 28-2930 | AQUEOUS SOLUTION | Vinyl acetate-crotonic acid-vinyl neodecanoate | ILC | 107.0 | complete | clear |
| Example 7 | 5% Resyn 28-1310 | AQUEOUS SOLUTION | Vinyl acetate-crotonic acid-vinyl neodecanoate | ILC | 35.0 | partial | clear |
| Example 8 | 10% Resyn 28-1310 | AQUEOUS SOLUTION | Vinyl acetate-crotonic acid | ILC | 65.5 | complete | clear |
| Example 9 | 15% Resyn 28-1310 | AQUEOUS SOLUTION | Vinyl acetate-crotonic acid | ILC | 157.4 | complete | clear |
| Example 10 | 20% Resyn 28-1310 | AQUEOUS SOLUTION | Vinyl acetate-crotonic acid | ILC | — | complete | clear |
| Example 11 | 10% Resyn 28-1310 plus 0.1% NALCO 1060 | AQUEOUS SOLUTION | Vinyl acetate-crotonic acid | ILC | 79.6 | complete | clear |
| Example 12 | 10% Resyn 28-1310 plus .5% NALCO 1060 | AQUEOUS SOLUTION | Vinyl acetate-crotonic acid | ILC | 96.8 | complete | clear |
| Example 13 | 10% Resyn 28-1310 plus 1.0% NALCO 1060 | AQUEOUS SOLUTION | Vinyl acetate-crotonic acid | ILC | 94.3 | complete | clear |
| Example 14 | 10% Resyn 28-2930 plus 0.1% NALCO 1060 | AQUEOUS SOLUTION | Vinyl acetate-crotonic acid-vinyl neodecanoate | ILC | 68.4 | complete | clear |
| Example 15 | 10% Resyn 28-2930 plus 0.5% NALCO 1060 | AQUEOUS SOLUTION | Vinyl acetate-crotonic acid-vinyl neodecanoate | ILC | 154.9 | complete | clear |
| Example 16 | 10% Resyn 28-2930 plus 1.0% NALCO 1060 | AQUEOUS SOLUTION | Vinyl acetate-crotonic acid-vinyl neodecanoate | ILC | 122.7 | complete | clear |
| Example 17 | 5% Resyn 28-1310 plus 0.25% NALCO 1060 | AQUEOUS SOLUTION | Vinyl acetate-crotonic acid | ILC | 33.2 | complete | clear |
| Example 18 | 12% Resyn 28-1310 | AQUEOUS SOLUTION | Vinyl acetate-crotonic acid | ILC | 126.6 | partial | clear |
| Example 19 | 15% Resyn 28-1310 | AQUEOUS SOLUTION | Vinyl acetate-crotonic acid | ILC | 400.8 | complete | clear |
| Example 20 | 11% Resyn 28-1310 plus 0.33% NALCO 1060 70% neutralized | AQUEOUS SOLUTION | Vinyl acetate-crotonic acid | ILC | 115.3 | partial | clear |
| Example 21 | 10% Resyn 28-1310 plus 0.1% NALCO 1060 70% neutralized | AQUEOUS SOLUTION | Vinyl acetate-crotonic acid | ILC | 100.2 | partial | clear |
| Example 22 | 10% Resyn 28-1310 plus 0.1% NALCO 1060 60% neutralized | AQUEOUS SOLUTION | Vinyl acetate-crotonic acid | ILC | 104.1 | partial | clear |
| Example 23 | 10% Resyn 28-1310 plus 0.1% NALCO 1060 80% neutralized | AQUEOUS SOLUTION | Vinyl acetate-crotonic acid | ILC | 97.2 | partial | clear |
| Example 24 | 10% Resyn 28-1310 70% neutralized | AQUEOUS SOLUTION | Vinyl acetate-crotonic acid | ILC | 100.2 | partial | clear |
| Example 25 | 12% Resyn 28-1310 plus 0.12% NALCO 1060 70% neutralized | AQUEOUS SOLUTION | Vinyl acetate-crotonic acid | ILC | 115.3 | par4tial | clear |
| Example 26 | 10% Resyn 28-1310 plus 0.5% NALCO 1060 70% neutralized | AQUEOUS SOLUTION | Vinyl acetate-crotonic acid | ILC | — | partial | clear |
| Example 27 | 12% Resyn 28-1310 plus 0.6% NALSO 1060 70% neutralized | AQUEOUS SOLUTION | Vinyl acetate-crotonic acid | ILC | 100.7 | partial | clear |

TABLE I-continued

| EXAMPLE | COATING FORMULATION | EMULSION or SOLUTION | CHEMICAL TYPE OF COATING POLYMER | ILC, OLC or DRAW DOWN (DD) | COATING WEIGHT (dry mg/m$^2$) | ACETONE REMOVAL | METAL FOIL APPEARANCE |
|---|---|---|---|---|---|---|---|
| Example 28 | 11% Resyn 28-1310 plus 0.33% NALSO 1060 70% neutralized | AQUEOUS SOLUTION | Vinyl acetate-crotonic acid | ILC | 92.4 | partial | clear |
| Comparative 1 | 10% Rhoplex B-85 0.1% Triton X-405 | EMULSION | Polymethyl methacrylate | ILC | 65.5 | none | slightly hazy |
| Comparative 2 | 2.5% Methocel | EMULSION | Hydroxypropyl methylcellulose | : DD | 190.0 | none | clear |
| Comparative 3 | 50% Duroset E200 | EMULSION | Ethylene-vinyl acetate | DD | 3800 | none | hazy |
| Comparative 4 | 40% Rhoplex WL-81 Corona on | EMULSION | Methacrylate-styrene copolymer | ILC | 801.5 | none | slightly hazy |
| Comparative 5 | 20% Rhoplex WL-81 Coronoa on | EMULSION | Methacrylate-styrene copolymer | ILC | 362.1 | none | slightly hazy |
| Comparative 6 | 40% Rhoplex WL-81 0.2% Triton X-405 Corona on | EMULSION | Methacrylate-styrene copolymer | ILC | — | none | very hazy |
| Comparative 7 | 40% Rhoplex WL-81 0.2% Triton X-405 Corona off | EMULSION | Methacrylate-styrene copolymer | ILC | — | none | very slightly hazy |
| Comparative 8 | 20% Rhoplex WL-81 0.1% Triton X-405 Corona on | EMULSION | Methacrylate-styrene copolymer | ILC | — | none | slightly hazy |
| Comparative 9 | 20% Rhoplex WL-81 0.1% Triton X-405 Corona off | EMULSION | Methacrylate-styrene copolymer | ILC | 319.6 | none | slightly hazy |
| Comparative 10 | 20% Rhoplex WL-81 Corona on | EMULSION | Methacrylate-styrene copolymer | ILC | 330.2 | none | slightly hazy |
| Comparative 11 | 40% Rhpolex AC-3001 Corona on | EMULSION | Acrylic | ILC | 623.2 | none | slightly hazy |
| Comparative 12 | 2% Resyn 28-1310 | AQUEOUS SOLUTION | Vinyl acetate-crotonic acid | ILC | 17.5 | none | clear |
| Comparative 13 | 20% Rhoplex AC-3001 plus 2% NALCO 1060 | EMULSION | Acrylic | ILC | 330.4 | none | hazy |
| Comparative 14 | 6% Gelva TS-30 | EMULSION | Vinyl acetate homopolymer | ILC | 67 | none | hazy |

Each of the release coatings made according to Examples 3–28 was continuous, uniform, smooth, non-grainy, and substantially clear. Each of the deposited metallized layers of Examples 3–28 was clear, non-hazy and non-cloudy, with the exception of Examples 3 and 4 which exhibited a slightly hazy metal foil appearance. Herein, the term "clear" means that the metal foil appearance was bright, shiny, had very high reflectance, and was mirror-like in appearance, as opposed to being hazy or otherwise dull or cloudy. The slightly hazy appearance of the metallized foil layers made on the strippable coatings of Examples 3 and 4 can be attributed to the heavy weight and slight non-uniformity of the release coatings which resulted from being coated manually by a draw down technique. Although the metallized layers formed on the release coatings of Examples 3 and 4 were slightly hazy, the coatings nonetheless acceptably stripped in acetone and can be used to make metallized layers and flakes where high quality foil appearance is not required. Examples 5–28 all had release coatings made from non-flammable, safe, aqueous solutions of coating polymer which were in-line coated and each Example provided a deposited metallized layer of high quality and excellent metallized foil appearance.

The clear appearance of each of the metallized films produced from inventive Examples 5–28 is a property attributable to the appearance and properties of the smooth, continuous and void-free underlying strippable release coatings of the invention. It is expected that the release coatings of Examples 5–28 would make excellent dissolvable substrates for the formation thereon of high-quality optically variable films and flakes.

In Table I above, samples which had acceptable acetone removal were those samples which exhibited at least about 5% removal of the release coating around the edges of the aluminum coated layer. Acceptable acetone removal of the release coating includes slight removal and partial removal of the release coating, where slight removal is from about 5% removal to about 10% removal and partial removal is from about 10% removal to about 25% removal. It was observed that after about 25% removal, the aluminum metal films easily became completely separated from the substrate, such that none of the samples had from about 25% release coating removal to about 100% removal without completely releasing the aluminum layer from the substrate. Very slight release coating removal, i.e., removal of from about 1% removal to about 5% removal of the release coating, was considered unacceptable.

Release coating removal amounts of from about 5% removal to about 25% removal are considered acceptable because in actual end use, optically variable layers, and not aluminum metallized layers, will most often constitute the overlayer which is deposited on the release coating. Vacuum deposited optically variable layers may tend to break-up upon removal of the release coating from the sustrate, as disclosed in U.S. Pat. No. 5,059,245 and 5,383,995 to Phillips, et al. As an optically variable metallized layer breaks-up, substantially complete attack of the entirety of the release coating is achieved. On the other hand, the unbroken purely aluminum metallized layer used for testing the present samples shown in Table I did not break-up as the overlayer was removed and thus the acetone could only attack the release coating at its periphery. Slight acetone removal of a release coating overcoated with a metallized aluminum layer is expected to provide complete removal of the release coating if the overcoated layer readily breaks-up when the release coating is removed, for example, when the overcoated layer is an optically variable layer used in the production of optically variable flakes.

As can be seen from the Examples and Comparative Examples above, the release coatings comprising the RESYN 28-1310 copolymer of vinyl acetate and crotonic acid were all acceptably or completely removed from the PET substrate (Examples 3, 5, 7–13 and 17–28) with the exception of the coating made from a 2% solids solution of the vinyl acetate and crotonic acid copolymer having a coating weight of 17.5 dry mg/m² (Comparative Example 12). Examples 3, 5, 7–13 and 17–28 define a range of acceptably strippable coating weights of the RESYN 28-1310 copolymer which spans from 33.2 dry mg/m² (Example 17) to 1200 dry mg/m² (Example 3). Given that the coating weight of 33.2 dry mg/m² was completely strippable in Example 17, and the coating weight of 17.5 dry mg/m² was not strippable in Comparative Example 12, it is expected that release coatings made of vinyl acetate and crotonic acid copolymers having coating weights of from about 25 dry mg/m² to about 1200 dry mg/m² or more, are acetone strippable.

The release coatings comprising the RESYN 28-2930 terpolymer of vinyl acetate, crotonic acid and vinyl neodecanoate (Examples 4, 6 and 14–16), were all acceptably or completely removed from the PET substrate and covered a range of coating weights spanning from 68.4 dry mg/m² to 1079 dry mg/m². Of the tested release coatings comprising the terpolymer, none were not strippable in acetone. Given the results of the acetone strippability tests for the terpolymer coatings, and the strippability of the coating made from the vinyl acetate/crotonic acid copolymer, it is expected that release coatings made of vinyl acetate, crotonic acid and vinyl neodecanoate terpolymers having coating weights of from about 25 dry mg/m² to about 1200 dry mg/m² or more, are acetone strippable.

Table I also shows that none of the comparative release coating formulations tested, which were made with acrylics or polymers other than those used according to the invention (Comparative Examples 1–11 and 13), exhibited acceptable removal when immersed in acetone. The failure of the Comparative coatings to strip renders the strippable release coatings according to the present invention even more unexpected and surprising.

Furthermore, Table I shows that the addition of from about 0.1% by weight to about 1.0% by weight NALCO 1060 slip agent to the coating formulation has no noticeable effect on acetone strippability of the release coating. Example 5, comprising a formulation of 10% by weight solids RESYN 28-1310 was completely strippable with acetone at similar coating weights to Examples 11, 12 and 13, which were also made from formulations comprising 10% by weight solids RESYN 28-1310. Examples 11, 12 and 13 differed from Example 5 in that they additionally contained 0.1, 0.5 and 1.0% by weight, respectively, NALCO 1060 silica slip agent additive. Therefore, it is believed that slip agent additives can be incorporated into the release coating formulations according to embodiments of the invention without deleteriously affecting acetone strippability of the coating. These results indicate that slip agents may thus be used to adjust the quality and characteristics of the release coatings and of overcoated metallized or optically variable layers, without compromising acetone strippability.

Examples 20 through 28 indicate that basic aqueous release coating solutions can be employed, according to embodiments of the invention, which neutralize as little as 60% of the carboxylic acid groups of the release coating copolymer or terpolymer of the invention. Thus, release coatings according to embodiments of the present invention can be formed from relatively safe aqueous solutions of the otherwise water-insoluble polymers used according to the invention.

Comparative Example 14 demonstrates that a release coating of a homopolymer vinyl acetate applied at a dry coating weight within the range of weights of the present invention does not strip in acetone, indicating that it is the crotonic acid component of the present invention, or the copolymer or terpolymer structure of the present coating formulations, that provide acetone strippability according to the present invention.

COMPARATIVE EXAMPLES 15–23

Nine Comparative coating formulations (Comparative Examples 15–23) were prepared and coated onto 400 gauge unfilled PET film substrates, then tested for acetone removal after deposition thereon of a metallized vacuum-deposited aluminum layer. The results of such tests are shown in Table II below.

For each sample, the release coating formulation comprised a solution or emulsion of the coating polymer which was applied to the unfilled, untreated (PET) substrate and dried. The coating formulations of Comparative Examples 15–23 were applied in wet laydown amounts sufficient to achieve the dry coating weights indicated in Table II.

The release coatings of Comparative Examples 15–23 were each formed by either a hand coating draw down technique (DD) which involved the hand draw-down of a coating solution bead using a #3 wire-wound Meyer rod, or by an in-line coating technique (ILC).

For each of Comparative Examples 15–21, the coating formulation was applied to an already tentered, biaxially oriented PET substrate by a hand draw down technique using a #3 wire-wound Meyer rod with no subsequent orientation or tentering of the coated substrate. The stretch ratio in each direction for the biaxially oriented PET substrate was about 3.5:1 to 4:1.

For Comparative Examples 22 and 23, the substrate was only uniaxially oriented or tentered in the machine direction at a stretch ratio of about 3.5:1 to 4:1 before the coating formulation was applied in-line. Then, after the formulation was coated onto the substrate, the coated substrate was oriented or tentered in the transverse direction at a stretch ratio of about 3.5:1 to 4:1.

Although some of the coating weights are not reported, Comparative Examples 15–21 had very heavy coating weights because the substrates in those samples were coated using a draw down technique and a #3 wire-wound Meyer rod. The coating weights of Comparative Examples 15–21 were also heavy because the substrate was not subsequently oriented or tentered after the release coating was applied thereto, which otherwise can reduce coating thickness to about 25% of its pre-stretched thickness. The dry coating weights indicated in Table II are the coating weights of each sample on its respective fully tentered substrate.

For Comparative Example 15, the cellulose acetate butyrate was applied from a flammable organic solvent solution. Regarding Comparative Example 16, RHOPLEX B-85 is a polymethyl methacrylate available from Rohm and Haas. In Comparative Examples 17 and 18, the polymer RHOPLEX WL-81 is a copolymer of styrene and acrylic ester available from Rohm & Haas, Philadelphia, Pa., described in connection with Comparative Examples 4–10 num layer could be removed by acetone-stripping the release coating. No scrubbing or scraping of the aluminum metal layer was used to facilitate release.

The acetone removal property and metal foil appearance of the metallized layer for each of Comparative Examples 15–23 is presented in Table II below:

TABLE II

| EXAMPLE | COATING FORMULATION | EMULSION or SOLUTION | CHEMICAL TYPE OF COATING POLYMER | ILC, OLC or DRAW DOWN (DD) | COATING WEIGHT (dry mg/m$^2$) | ACETONE REMOVAL | METAL FOIL APPEARANCE |
|---|---|---|---|---|---|---|---|
| Comparative 15 | Cellulose acetate butyrate | ORGANIC SOLUTION | Cellulose acetate butyrate | DD | — | complete | clear |
| Comparative 16 | Rhoplex B-85 | EMULSION | Polymethyl methacrylate | DD | — | complete | clear |
| Comparative 17 | Rhoplex WL-81 | EMULSION | Methacrylate-styrene copolymer | DD | — | complete | very hazy |
| Comparative 18 | 20% Rhoplex WL-81 plus 1% Triton X-405 | EMULSION | Methacrylate-styrene copolymer | DD | 1520 | complete | hazy |
| Comparative 19 | Glascol RP-2 | EMULSION | Carboxylated acrylic | DD | — | slight | clear |
| Comparative 20 | Acryloid WL-97 | WATER REDUCIBLE SOLUTION | Acrylic soluiton | DD | — | partial | very hazy |
| Comparative 21 | 48% Rhoplex AC-3001 | EMULSION | Acrylic polymer | DD | 3648 | partial | very hazy |
| Comparative 22 | 20% Adcote 61JH61A | EMULSION | Acrylate-styrene copolymer | ILC | 293 | slight | slightly hazy |
| Comparative 23 | 40% Adcote 61JH61A | EMULSION | Acrylate-styrene copolymer | ILC | 329 | complete | hazy | above. In Comparative Example 18, TRITON X-405 is a nonionic surfactant of the chemical family of alkylaryl polyether alcohols, and is available from Union Carbide, Danbury, Conn. In Comparative Example 19, GLASCOI, RP-2 is a proprietary formulation of a carboxylated acrylic polymer available from Allied Colloids, Inc., Suffolk, Va. In Comparative Example 20, ACRYLOID WR-97 is a proprietary water-reducible acrylic solution resin available from Rohm and Haas, Philadelphia, Pa. In Comparative Example 21, RHOPLEX AC-3001 is a proprietary acrylic polymer available from Rohm and Haas, Philadelphia, Pa. It is believed that RHOPLEX AC-3001 is a copolymer of styrene and an acrylic ester. In Comparative Examples 22 and 23, the polymer ADCOTE 61JH61A is a proprietary polymer available from Morton International, Chicago, Ill. Integrated proton NMR spectra analysis indicates that ADCOTE 61JH61A is a copolymer comprising about 67 mole percent (about 62% by weight) polystyrene and about 33 mole percent (about 38% by weight) poly(n-butyl acrylate).

For each of the formulations identified as emulsions in Table II, the formulation comprised a fluid consisting of a microscopically heterogeneous mixture of the coating polymer suspended in deionized water. Proprietary emulsifiers were incorporated into the emulsions by the respective suppliers. Some of the emulsions were diluted with deionized water to obtain lower solids contents.

After the release coating formulations were allowed to dry, a layer of aluminum metal was vacuum deposited on each release coating in a bell jar metallizer. The vacuum deposited aluminum metallized layer had a thickness of from about 400 angstroms to about 600 angstroms. The aluminum coated samples were then immersed in room-temperature acetone and agitated to determine if the alumi Although the release coating for each of Comparative Examples 15–23 exhibited acceptable strippability in acetone, each Comparative Example suffered from one or more problems not encountered with the formulations according to embodiments of the present invention. Of the acetone-strippable comparative samples, only Comparative Examples 15, 16 and 19 produced vacuum-deposited aluminum layers which had a clear metallized foil appearance. Comparative Examples 17, 18 and 20–23 each produced a vacuum-deposited aluminum layer having a hazy metallized foil appearance. Therefore, the release coatings of Comparative Examples 17, 18 and 20–23 would not be expected to provide a useful strippable support for the formation of optically variable metallized films and flakes.

Despite its clear metallized foil appearance, the release coating of Comparative Example 15 was not in-line coated but instead was drawn down by hand from a flammable organic solution of cellulose acetate butyrate. The cellulose acetate butyrate cannot be coated from a non-flammable aqueous coating solution because the polymer is not water soluble. The flammability of the coating solution used in Comparative Example 15 renders the formulation unsuitable for in-line coating procedures where flammable solvents are not used, for safety reasons.

Although the Comparative Example 19 sample produced a vacuum-deposited aluminum layer having a clear metallized foil appearance, the GLASCOL RP-2 polymer is a proprietary acrylic polymer and exhibited only slight removal in acetone. Also, the GLASCOL RP-2 polymer of Comparative Example 19 was coated by a hand draw down technique that results in a thick release coating and high coating weight. It has been found that, in general, release coatings having lighter coating weights tend to be more difficult to strip than those of heavier coating weights. It is believed that when the coating weight is low: (1) some bonding between the overcoated deposited metallized layer and the underlying PET substrate may occur, or (2) the surface area of the coating subject to attack, e.g. the edge of the coating, is too low. For example, Comparative Example 18 was a strippable coating formulation of the RHOPLEX WL-81 polymer having a coating weight of 1520 dry mg/m$^2$, whereas the same polymer with and without TRITON X-405 additive was not strippable at coating weights of from 319.6 dry mg/m$^2$ to 801.5 dry mg/m$^2$, as shown in Comparative Examples 4–6 and 9–10. Thus, it is expected that commercially applicable dry coating weights of from about 25 dry mg/m$^2$ to about 130 dry mg/m$^2$, for example, as achieved from in-line coating processes, would not provide strippable coatings of the GLASCOL RP-2 polymer used in Comparative Example 19.

Extremely heavy coating weights are particularly necessary for strippable polymers which do not form continuous, homogeneous coatings which are free of voids. However, such coatings generally fail to provide smooth and clear overcoated vacuum deposited metallized layers. For example, Comparative Example 16 had a strippable release coating of polymethyl methacrylate but did not form a smooth and continuous coating. The strippable Comparative Example 16 coating was formed by a draw down technique and is believed to have had a heavy coating weight because there was no subsequent stretching of the PET substrate after the coating formulation was applied. Due to the heavy dry coating weight of the Comparative Example 16 release coating, there was no bonding between the overcoated metallized layer and the underlying PET substrate, but the release coating required an excessive amount of polymer and does not strip when thinner, commercially preferred release coatings are formed.

Comparative Example 1, shown in Table I above, is comparable to Comparative Example 16 in that the Comparative Example 1 release coating formulation also comprised the polymethyl methacrylate polymer RHOPLEX B-85. Although the Comparative Example 1 sample had a minor amount of added TRITON X-405 surfactant, it is believed that the surfactant had little to no effect on strippability of the polymer. As can be seen from Tables I and II, the Comparative Example 1 sample had a light dry coating weight (65.5 mg/m$^2$) provided by the in-line coating process and subsequent substrate stretching, and was not strippable in acetone. It is apparent that the coating weight of the Comparative Example 1 sample was not heavy enough to prevent some bonding of the overcoated vacuum-deposited metal layer to the underlying PET substrate.

We claim:

1. A method of making a thin layer or flakes of material comprising:
   providing a substrate of a first material having a surface,
   forming a release coating on said surface, said release coating comprising a polymer of crotonic acid, said polymer being soluble in a solvent,
   forming a layer of a second material on said release coating on said substrate, said second material being at least substantially insoluble in said solvent, and
   contacting said release coating with said solvent to dissolve said release coating and release said layer of second material as a thin layer or flakes.

2. A method as in claim 1 wherein said polymer comprises a polymer of vinyl acetate and crotonic acid.

3. A method as in claim 1 wherein said polymer comprises a polymer of vinyl acetate, crotonic acid, and vinyl neodecanoate.

4. A method as in claim 1 wherein said polymer consists essentially of a polymerization product of vinyl acetate and crotonic acid.

5. A method as in claim 1 wherein said polymer consists essentially of a polymerization product of vinyl acetate, crotonic acid and vinyl neodecanoate.

6. A method as in claim 1 wherein said polymer comprises a polymerization product of from about 50% by weight to about 95% by weight vinyl acetate, and from about 5% by weight to about 50% by weight crotonic acid, said weight percentages adding up to 100%.

7. A method as in claim 6 wherein said polymer comprises a polymerization product of from about 50% by weight to about 95% by weight vinyl acetate, from about 5% by weight to about 50% by weight crotonic acid, and from about 0.001% by weight to about 5% by weight vinyl neodecanoate, 3aid percentages adding up to 100%.

8. A method as in claim 1 wherein said polymer comprises a polymerization product of from about 70% by weight to about 92% by weight vinyl acetate, and from about 8% by weight to about 30% by weight crotonic acid, said percentages adding up to 100%.

9. A method as in claim 7 wherein said polymer comprises a polymerization product of from about 70% by weight to about 92% by weight vinyl acetate, from about 8% by weight to about 30% by weight crotonic acid, and from about 0.001% by weight to about 5% by weight vinyl neodecanoate, said percentages adding up to 100%.

10. A method as in claim 1 wherein said substrate comprises a flexible web of a polyester material.

11. A method as in claim 1 wherein said substrate comprises a flexible web of polyethylene terephthalate.

12. A method as in claim 1 wherein said layer of second material comprises a multilayered optically variable coating material.

13. A method as in claim 1 wherein said step of forming a release coating comprises:
   forming a release coating solution of said polymer by dissolving said polymer in a basic aqueous solvent which is sufficiently alkaline to neutralize the polymer and render the polymer soluble in the basic aqueous solvent,
   coating said release coating solution on said substrate, and
   drying said release coating solution to evaporate volatiles in said basic aqueous solvent and form said release coating.

14. A method as in claim 13 wherein said basic aqueous solution is sufficiently alkaline to cause at least a 60% neutralization of said polymer.

15. A method as in claim 1 wherein forming said layer comprises vacuum depositing a metallized layer on said release coating.

16. A method as in claim 1 wherein said substrate is a flexible web, providing a substrate comprises the step of drawing a polymeric web, and forming a release coating on said surface involves in-line coating the surface of the drawn polymeric web.

17. A method as in claim 1 wherein providing a substrate includes surface treating said surface prior to forming said release coating thereon.

18. A method as in claim 1 wherein said solvent is acetone.

19. A method as in claim 1 wherein said substrate comprises a slip agent filled polyethylene terephthalate.

20. A method as in claim 1 wherein said substrate comprises a flexible web of polyethylene terephthalate, said solvent comprises acetone, and said layer of second material is a multilayered optically variable structure.

21. A method as in claim 1, wherein said substrate comprises a polyester film, and said release coating is passed through said solvent to cause said layer of second material to flake off of said film.

22. A method as in claim 1 wherein prior to contacting said release coating with said solvent, said release coating with said layer of second material formed thereon is transferred to a second substrate, and said release coating is then contacted with said solvent to dissolve said release coating and result in the transfer of said layer of second material onto said second substrate.

23. A method as in claim 1 wherein said release coating has a coating weight on said substrate of from about 25 dry mg/m$^2$ to about 1200 dry mg/m$^2$.

24. A method as in claim 1 wherein forming said release coating comprises forming a solution of said polymer dissolved in a second solvent, said solution comprising a solids content of from about 5% by weight to about 20% by weight based on the weight of the solution, coating said solution on a substrate which is a flexible web, and drying said solution.

25. In combination, a substrate and a release coating formed thereon, said substrate comprising a layer of flexible polymeric material, said release coating being soluble in a solvent and comprising a polymer of crotonic acid, said release coating having a coating weight such that a layer of a second material deposited upon said release coating is released as a layer or flakes when contacted with said solvent.

26. A combination as in claim 25 wherein said polymer comprises a polymerization product of vinyl acetate and crotonic acid and said layer of second material comprises an optically variable coating material.

27. A combination as in claim 26 wherein said polymer comprises a polymerization product of vinyl acetate, crotonic acid and vinyl neodecanoate.

28. A combination as in claim 25 wherein said polymer consists essentially of a copolymer of vinyl acetate and crotonic acid.

29. A combination as in claim 25 wherein said polymer consists essentially of a terpolymer of vinyl acetate, crotonic acid and vinyl neodecanoate.

30. A combination as in claim 25 wherein said polymer comprises a polymerization product of from about 50% by weight to about 95% by weight vinyl acetate, and from about 5% by weight to about 50% by weight crotonic acid, said percentages adding up to 100%.

31. A combination as in claim 30 wherein said polymer comprises a polymerization product of from about 50% by weight to about 95% by weight vinyl acetate, from about 5% by weight to about 50% by weight crotonic acid, and from about 0.001% by weight to about 5% by weight vinyl neodecanoate, said percentages adding up to 100%.

32. A combination as in claim 25 wherein said polymer comprises a polymerization product of from about 70% by weight to about 92% by weight vinyl acetate, and from about 8% by weight to about 30% by weight crotonic acid, said percentages adding up to 100%.

33. A combination as in claim 32 wherein said polymer comprises a polymerization product of from about 70% by weight to about 92% by weight vinyl acetate, from about 8% by weight to about 30% by weight crotonic acid, and from about 0.001% by weight to about 5% by weight vinyl neodecanoate, said percentages adding up to 100%.

34. A combination as in claim 25 wherein said polymeric material comprises polyethylene terephthalate.

35. A combination as in claim 25 wherein said polymeric material comprises a slip agent-filled polyethylene terephthalate.

36. A combination as in claim 25 further comprising a layer of said second material deposited on said release coating, said layer of second material comprising a multi-layered optically variable coating material.

37. A combination as in claim 25 further comprising a layer of said second material deposited on said release coating, said layer of second material comprising a vacuum deposited metallized layer.

38. A combination as in claim 25 wherein said polymer is soluble in acetone.

39. A combination as in claim 25 wherein said polymeric material comprises polyethylene terephthalate and said polymer is soluble in acetone.

40. A combination as in claim 25 further comprising a layer of said second material deposited on said release coating, and wherein said layer of second material comprises an optically variable coating material, said polymeric material comprising polyethylene terephthalate, and said polymer is soluble in acetone.

41. A combination as in claim 25 wherein said release coating comprises a coating of said polymer formed from a solution of said polymer dissolved in a basic aqueous solvent.

42. A combination as in claim 25 wherein said release coating has been formed from a solution of said polymer dissolved in an aqueous ammonium hydroxide solution.

43. A combination as in claim 25 wherein said release coating has a coating weight of from about 25 dry mg/m$^2$ to about 1200 dry mg/m$^2$.

44. A combination as in claim 25 wherein said release coating has a coating weight of from about 30 dry mg/m$^2$ to about 130 dry mg/m$^2$.

45. A combination as in claim 25 wherein said support is reclaimable.

* * * * *